US009426749B2

(12) United States Patent
Cordeiro et al.

(10) Patent No.: US 9,426,749 B2
(45) Date of Patent: Aug. 23, 2016

(54) METHOD AND APPARATUS FOR BLUETOOTH-BASED WI-FI SYNCHRONIZATION (71) Applicant: INTEL IP CORPORATION, Santa Clara, CA (US)

(72) Inventors: Carlos Cordeiro, Portland, OR (US); Robert Stacey, Portland, OR (US); Emily H. Qi, Camas, WA (US); David J. McCall, Dallas, TX (US); Po-Kai Huang, Santa Clara, CA (US); Robert D. Hughes, Tualatin, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/329,444

(22) Filed: Jul. 11, 2014

(65) Prior Publication Data

US 2015/0319555 A1 Nov. 5, 2015

Related U.S. Application Data (60) Provisional application No. 61/988,546, filed on May 5, 2014.

(51) Int. Cl.
*H04W 4/00* (2009.01)
*H04W 52/02* (2009.01)
*H04M 1/725* (2006.01)
*H04W 56/00* (2009.01)
*H04W 88/06* (2009.01)
*H04W 76/02* (2009.01)

(52) U.S. Cl.
CPC ......... *H04W 52/028* (2013.01); *H04M 1/7253* (2013.01); *H04W 4/00* (2013.01); *H04W 4/008* (2013.01); *H04W 52/0209* (2013.01); *H04W 52/0229* (2013.01); *H04W 56/00* (2013.01); *H04W 56/001* (2013.01); *H04W 76/023* (2013.01); *H04W 88/06* (2013.01)

(58) Field of Classification Search
CPC .. H04W 4/008; H04W 4/20; H04W 56/0015
See application file for complete search history.

(56) References Cited

U.S. PATENT DOCUMENTS

| 7,734,293 B2* | 6/2010 | Zilliacus | H04W 36/0066 370/328 |
| 2007/0014269 A1* | 1/2007 | Sherman | H04W 48/12 370/338 |
| 2009/0034498 A1* | 2/2009 | Banerjea | H04W 76/025 370/338 |
| 2012/0182976 A1* | 7/2012 | Thoukydides | H04W 72/1215 370/336 |
| 2012/0328061 A1* | 12/2012 | Chow | H04W 56/0015 375/354 |
| 2013/0044739 A1* | 2/2013 | Huang | H04W 52/0216 370/338 |
| 2015/0006633 A1* | 1/2015 | Vandwalle | H04L 67/1051 709/204 |

* cited by examiner

Primary Examiner — David Bilodeau
(74) Attorney, Agent, or Firm — Salehi Law Group (57) ABSTRACT The disclosure relates to a method and apparatus for leveraging Bluetooth (BT) or Bluetooth low energy (BLE) technologies to conserve energy in multi-mode devices. In one embodiment, the disclosure relates to synchronizing a first wireless platform with a second wireless platform by exchanging Wi-Fi synchronization information through BT packets. Each of the first and the second wireless platforms may have integrated Wi-Fi (or other communication modalities) with a BT radio. In one embodiment of the disclosure, the Wi-Fi communication modes are kept at sleep mode while the BT modalities exchange synchronization information.

22 Claims, 5 Drawing Sheets

METHOD AND APPARATUS FOR BLUETOOTH-BASED WI-FI SYNCHRONIZATION

The instant application claims priority to Provisional Application Ser. No. 61/988,546, filed May 5, 2014, the specification of which is incorporated herein in its entirety.

BACKGROUND

1. Field

The disclosure relates to a method, apparatus and system for Bluetooth-based Wi-Fi synchronization. Specifically, the disclosure relates to a method and apparatus for leveraging Bluetooth (BT) technology to conserve energy in multi-mode devices.

2. Description of Related Art

Bluetooth technology provides connectivity between BT mobile devices and a variety of Bluetooth systems, including cars, exercise devices, computers, phones, tablets and the like. The BT technology supports low power consumption as compared to traditional devices operating on cellular or Wi-Fi modes. For example, a BT mobile device may be a small sensor, a watch, or a Smartphone having a battery with limited power supply and the BT technology may enable the device to communicate with the variety of systems consuming significantly less power than traditional devices.

With the emergence of applications around social networking, Internet of Things (IoT), wireless docking and the like, there is a need to design low power solutions that can be continually on. There is a growing need for an improved, low power service discovery mechanism using BT technology to advance Wi-Fi and other communication modes. Since most mobile devices have integrated BT and Wi-Fi (and/or WiGig), it is possible to design an efficient and scalable mechanism that uses BT and Wi-Fi (and/or cellular or WiGig) to significantly reduce device power consumption.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.11ad-2012, IEEE Standard for Information Technology and brought to market under the WiGi brand— Telecommunications and Information Exchange Between Systems—Local and Metropolitan Area Networks—Specific Requirements—Part 11: Wireless LAN Medium Access Control (MAC) and Physical Layer (PHY) Specifications— Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

The disclosure is generally directed to providing power efficiency in multi-mode communication devices and environments. In one embodiment, BT communication mode is used to acquire time synchronization information for other communication modes, for example, the Wi-Fi mode. The embodiments disclosed herein apply equally to other wireless communication modes, including WiGig or cellular.

Figure 1:
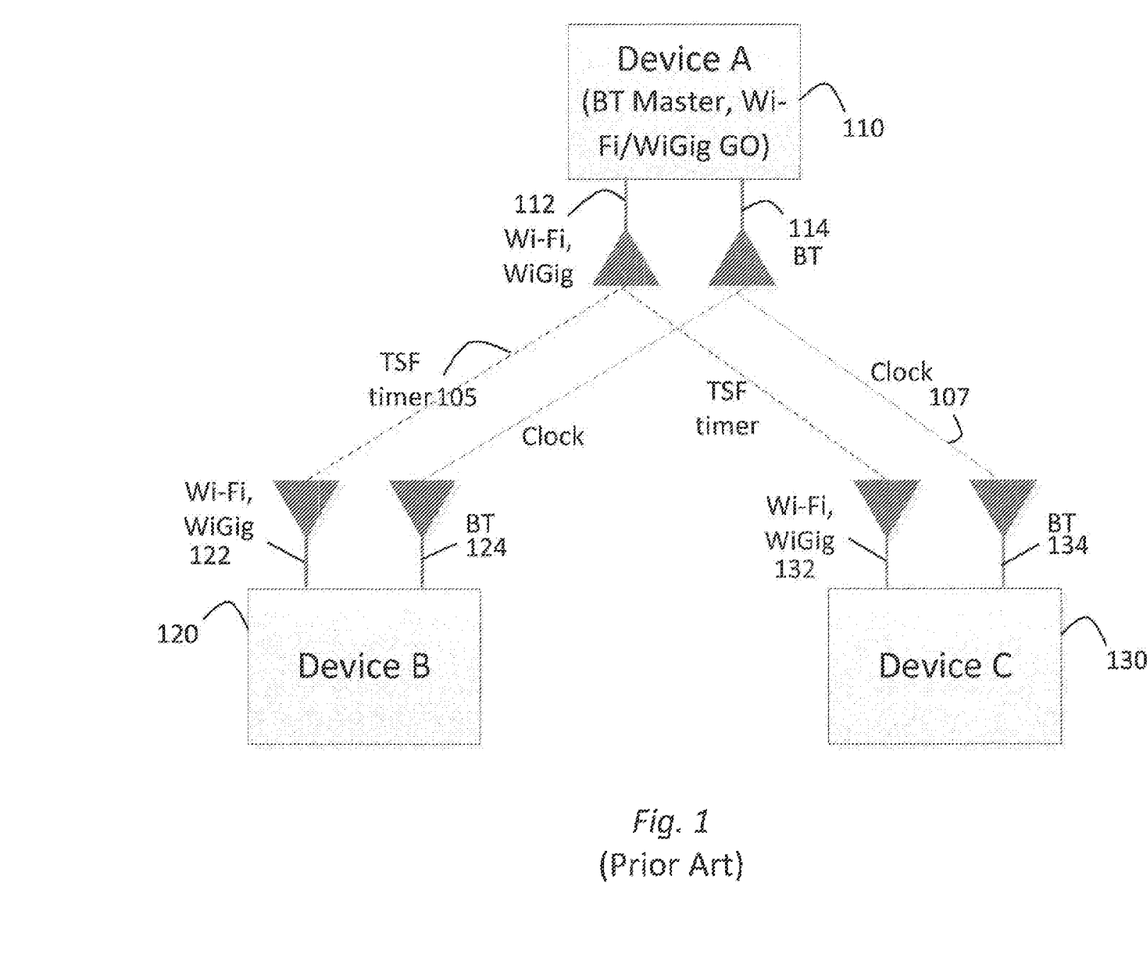
FIG. 1 shows conventional synchronization in a multi-mode communication system.

FIG. 1 shows conventional synchronization in a multi-mode communication system. Specifically, FIG. 1 shows Device A 110, Device B 120 and Device C 130. Each of Devices A, B and C comprises two radios and two antennas (or a single shared antenna). Device A includes Wi-Fi/WiGig antenna 112 and BT antenna 114. Device B includes Wi-Fi/WiGig antenna 122 and BT antenna 124. Device C includes Wi-Fi/WiGig antenna 132 and BT antenna 134. In the embodiment of FIG. 1, Device A is the master (e.g., network coordinator, AP, Group Owner (GO)) and Devices B and C are the slaves. Device A transmits BT communication through antenna 114 and transmits Wi-Fi/WiGig communications through Wi-Fi/WiGig antenna 112. The conventional embodiment of FIG. 1 shows independent synchronization between the radios for each of the Wi-Fi and BT modes. That is, the Wi-Fi/WiGig radios (not shown) are synchronized using the Timing Synchronization Function (TSF) signal 105 pursuant to the IEEE 802.11 protocol. The TSF signal keeps the timers for all communicating devices synchronized. Under the 802.11 protocol all devices maintain a local TSF timer. The BT radios (not shown) are synchronized using clock signal 107 issued from Device A. The TSF signal 105 and clocks signal 107 are issued independently of each other.

The architecture of FIG. 1 is inefficient because it requires all radios to be actively engaged continually in order to find each other and to synchronize with each other. The inefficiency causes high power consumption, low battery life and diminished consumer satisfaction.

To overcome these and other deficiencies of the conventional techniques, the disclosure relates to a method, apparatus and a system for utilizing one of the plurality of radios to maintain synchronicity while activating the remainder of the system only when necessary to conduct a related task or large data transfer. For example, in multi-radio systems where multiple communication device communicate through different modalities (e.g., BT, Wi-Fi, cellular, WiGig, etc.), one of the modalities can be selected to maintain synchronicity while other modalities are activated on as-needed basis. In an exemplary embodiment, the BT mode may be used to maintain clock synchronicity between devices while other modes (or other parts of the system responsible for other communication modes) remain inactive.

Figure 2:
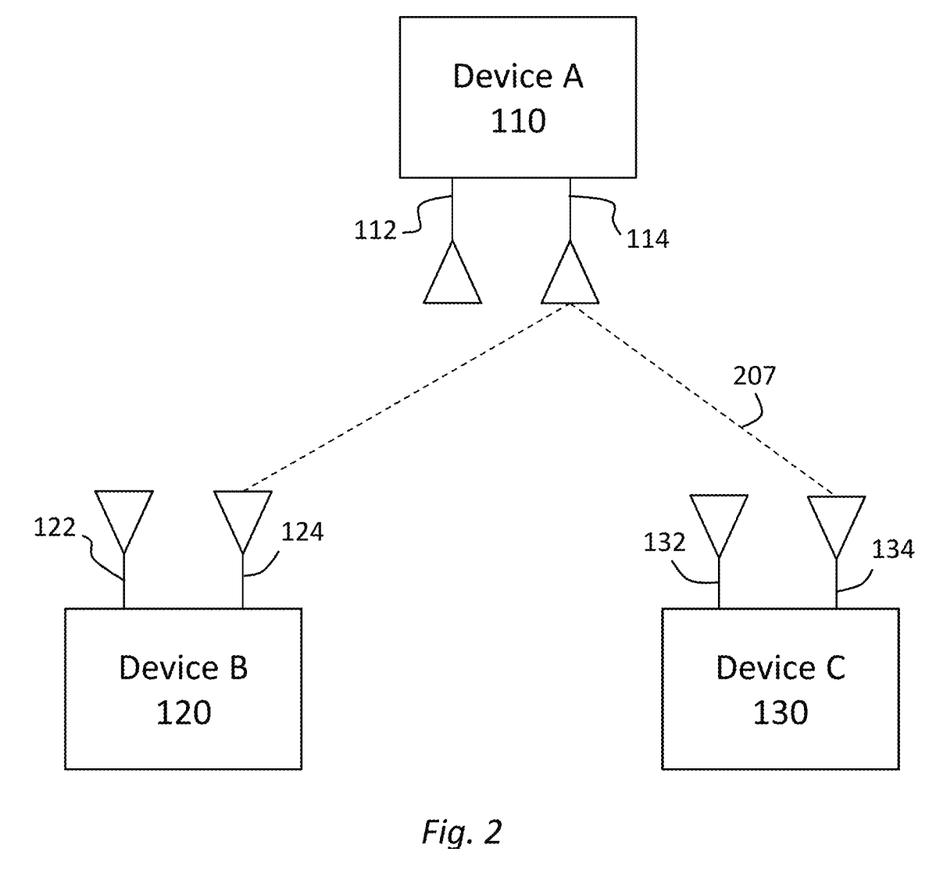
FIG. 2 schematically illustrates a communication system according to one embodiment of the disclosure.

FIG. 2 schematically illustrates a communication system according to one embodiment of the disclosure. Specifically, FIG. 2 illustrates using BT signal 207 for Wi-Fi (or WiGig) synchronization. In FIG. 2, Device A communicates with Devices B and C. Device A is the master and maintains the system clock. Devices B and C must synchronize to the master clock of Device A. Each of the three devices has at least two radios. Thus, Device A includes a first radio (not shown) and antenna 112 and a second radio (not shown) and antenna 114. First antenna 112 may define a Wi-Fi, WiGig or cellular antenna in communication with the appropriate radio (not shown). Similarly, each of Devices B and C may have a respective first antennas 122 and 132 for Wi-Fi, WiGig or cellular communication.

Each of Devices A, B and C is also shown with second antenna 114, 124 and 134. Each second antenna may communicate with a secondary radio (not shown). The secondary radio may use BT or BLE communication mode. Though not shown, each device may also include additional radios and corresponding antennas used for additional communication modes. In another embodiment of the disclosure, each device may have only one antenna shared by different radios in a multiplexed manner.

In the exemplary embodiment of FIG. 2, signal 207 is used to synchronize both BT and Wi-Fi/WiGig radios. Thus, signal 207 carries the master clock signal for the BT system as well as the TSF signal for the Wi-Fi/WiGig synchronization. Combining the signals into a BT packet allows significant power saving in that the Wi-Fi/WiGig radios can remain be in the sleep mode when not transmitting/receiving, thereby not using power.

Time synchronization information in the Wi-Fi environment is conventionally made as broadcasted beacon signals. Each device captures the signal and determines an offset from the master (i.e., AP, GO, PCP) clock. Each device then adjusts itself to run at the same pace as the master clock.

In one embodiment of the disclosure, synchronization or clock information may be transmitted through the BT channel. Here, the conventional BT protocol may be used to formulate BT communication packets. The BT packets may contain a place holder for receiving Wi-Fi synchronization information (i.e., TSF). Additional information may be included in the place holder as needed. The clock synchronization information may be extracted from the BT packet by a processor and used to synchronize the non-BT radios in the background. This task may be done while such radios are in sleep mode. In an exemplary embodiment, the background synchronization may include using the operating system (OS) running on the host computer or, if all radios are within the same system-on-chip (SOC), the background synchronization can be confined to within the SOC and without involving the host computer.

In the OS embodiment of the disclosure, multiple stand-alone communication modes are synchronized through a software. Here, each standalone radio has a unique Media Access Control (MAC) address or unique network interface card (NIC). The software (or app) extracts synchronization information from the BT packet and directs each NIC to synchronize accordingly. The OS may use direct memory access (DMA) to convey information to each of the stand-alone radios. In this embodiment, the OS is not directly synchronizing each radio. Rather, a DMA controller addresses each standalone communication mode. The OS merely configures the DMA with appropriate instruction information.

In the SOC embodiment of the disclosure, an integrated chipset or radio may be used for both communication modes. For example, the same SOC may be configured to control both the BT and Wi-Fi communication modes. The BT and Wi-Fi modes may have a shared antenna or each may have its own antenna. The SOC may include an integrated processor which receives the BT packet. Appropriate information for Wi-Fi synchronization may be extracted and used to synchronize the Wi-Fi communication mode. Similarly, appropriate BT clock information may be used to synchronize the BT systems. In one embodiment, a shared memory can be used for the communication modes. The information can be written in the shared memory and each communication mode can then read the appropriate information. Alternatively, a shared bus can be used and the two radios may communicate directly over the bus.

In another embodiment of the disclosure, the Wi-Fi/WiGig radios and antennas synchronize to a master clock upon power-up or on intermittent basis. Thereafter, these radios will go into sleep mode (inactive, standby) and the relevant portions of chipsets remain at the sleep (or standby) mode to minimize power consumption. During these periods, the BT signal communication mode can be used to maintain clock synchronicity not just between the BT radios, but also between the Wi-Fi/WiGig or other communication modes. When large data transfer is needed, the Wi-Fi radio is awakened. The Wi-Fi radio is pre-synchronized with other peer Wi-Fi radios through the BT communication mode. The Wi-Fi radios can then exchange data and go back to the inactive mode thereafter.

It should be noted that different inactive modes can be used to conserve energy. For example, the antenna alone or the antenna and the radio (front end RF radio) may be in sleep mode. Alternatively, parts of all the chipset managing Wi-Fi operation may be in sleep mode. In still another embodiment, a controller can determine which parts of the integrated circuit (IC) can be turned off to conserve energy. While the BT peripherals communicate regularly, the Wi-Fi peripherals may be activated intermittently during regular intervals (e.g., every so 30 seconds) for additional synchronization or they may remain inactive until needed for Wi-Fi transactions.

Referring again to FIG. 2, signal 207 may be configured to communicate the 802.11 TSF timer value over the BT interface. This allows instantaneous synchronization of the Wi-Fi interface across all devices as soon as the Wi-Fi interface powers up. Conversely, the devices do not need to power up the Wi-Fi radio in order to obtain Wi-Fi synchronization. Because the BT radio has significantly lower power than the Wi-Fi radio, maintaining synchronization between all the radios of multiple devices will not consume excessive power.

In another embodiment of the disclosure, the BT radio can be used for continuous background discovery. Once a device and/or service is found that matches the application's needs, then the Wi-Fi radio is powered up. Since synchronization is already in place over Wi-Fi, the time and power consumption of Wi-Fi discovery process can be significantly streamlined and shortened to reduce the device's overall power consumption.

Figure 3:
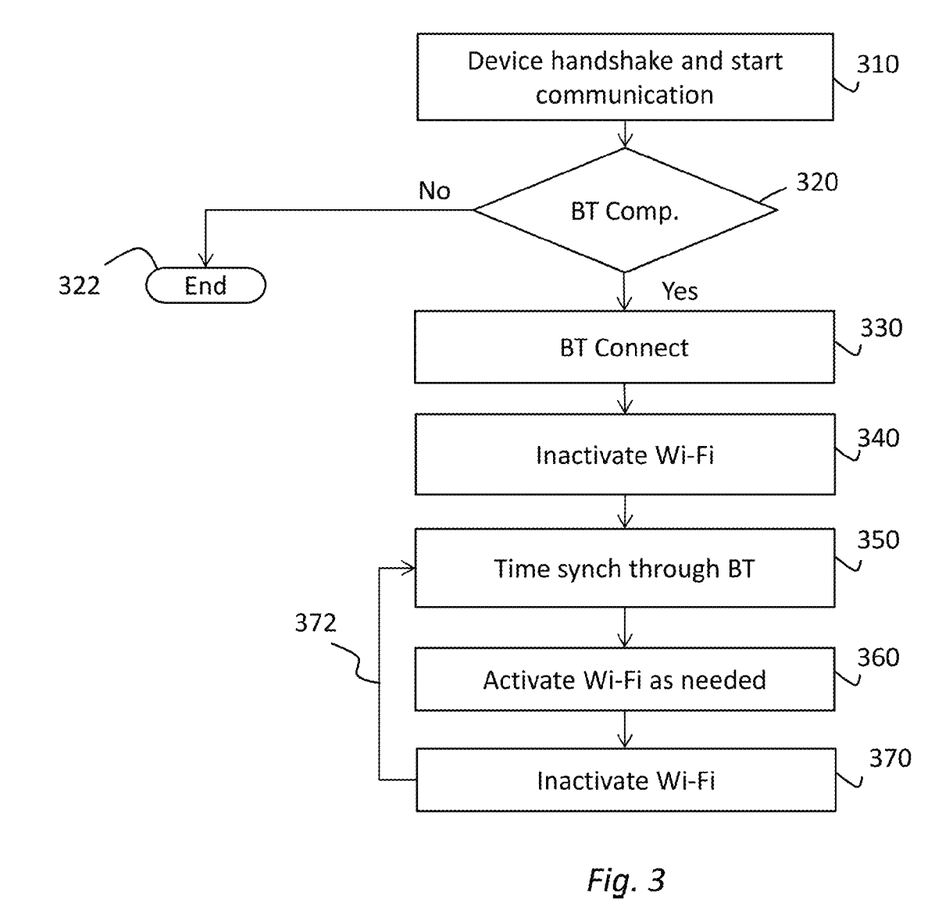
FIG. 3 is a flow diagram of an exemplary method according to one embodiment of the disclosure.

FIG. 3 is a flow diagram of an exemplary method according to one embodiment of the disclosure. The method of FIG. 3 starts at step 310 where two or more devices (e.g., Devices A, B and/or C of FIG. 2) start communicating with each other. The communication may occur in a primary mode, including, cellular, Wi-Fi, WiGig, etc. In one example, step 310 may comprise a device identifying and joining an ad hoc wireless network. In another example, step 310 may comprise a portable device identifying and joining a wireless local area network.

At step 320, inquiry is made as to whether a device of interest is BT compatible. This inquiry may be made by an initiating device (e.g., Device A). The inquiry may be made using the primary communication mode (e.g., Wi-Fi and/or WiGig) or may be made using conventional BT search and identification protocol. When using a conventional BT search and identification protocol, Device A scans for devices matching its needs and/or capability or broadcasts a BT advertising signal with its needs and/or capabilities. If advertising, Device A may broadcast a BT advertisement packet. The corresponding device (e.g., Device B) may respond to the inquiry by transmitting a response signal if it supports the advertised needs and/or capabilities. When using the primary communication mode, Device A may send a network data packet to Device B to inquire whether Device B is BT compatible. If Device B is not BT-compatible, the flow diagram ends at step 322. If Device B is BT compatible, Devices A and B may exchange information to establish a BT communication link. For example, a BT communication link may be established by exchanging BT credential through the primary communication mode. Once established (step 330), BT communication defines a secondary communication mode on a secondary communication channel. The BT connection and signaling can be governed by BT protocols. As such, the BT connection may include regular information exchange to maintain connectivity.

At step 340 the Wi-Fi radio may enter sleep mode to conserve power. During sleep mode, parts or all of the system supporting the primary communication mode may be inactive to conserve power. For example, parts of the IC, SOC, the radio and the antenna supporting the primary communication mode may be turned off completely or placed on standby mode.

At step 350, the secondary communication mode is used to time-synchronize the corresponding devices in both the primary and the secondary communication modes. That is, the BT packets may be used to synchronize devices, for example, by exchanging TSF information as well as clock data. In an exemplary embodiment, BT scan packets can be exchanged between the corresponding devices. The BT scan packets may include one or more segments dedicated for synchronization information for the primary communication mode. The various embodiments disclosed herein can be used for synchronization.

At step 360, the primary communication mode is activated as needed to exchange Wi-Fi data. The Wi-Fi activation may comprise pinging each of the devices' radios out of the sleep mode. Because the corresponding devices have remained synchronized through the BT connection, data transmission may occur immediately and without delay or the need for additional synchronization.

Once data transfer is complete, the primary communication mode of each device is again inactivated to conserve energy. The corresponding systems may then enter energy conservation mode as shown by arrow 372 and maintains synchronization through the secondary (BT) communication mode.

Figure 4:
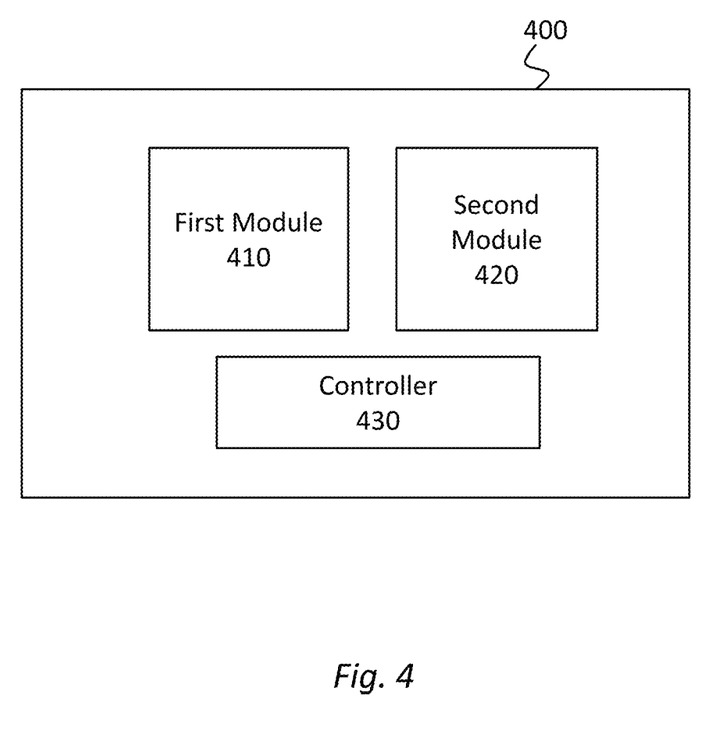
FIG. 4 is an exemplary apparatus for implementing an embodiment of the disclosure.

FIG. 4 is an exemplary apparatus for implementing an embodiment of the disclosure. Specifically, FIG. 4 shows device 400 which can be an integral part of a larger system or can be a stand-alone unit. For example, device 400 can define an SOC configured to implement the disclosed methods. Device 400 may also be part of a larger system having one or more antennas, one or more radios and one or more processor and memory systems. Device 400 may define a software or an app which can be configured into an existing controller to enable the functionalities disclosed herein.

Device 400 is shown with first module 410 and second module 420. First module 410 may define a primary communication mode, for example, Wi-Fi. Though not shown, module 410 may further comprise, or associate with, a Wi-Fi radio, Wi-Fi antenna, circuitry and software and/or firmware required for Wi-Fi communication. Module 420 may define a secondary communication mode, for example, BT. Though not shown, module 420 may further comprise, or associate with, a BT radio, BT antenna, circuitry, software and/or firmware required for BT communication. In an exemplary embodiment, at least one of module 410 or 420 defines a processor or processor logic configured to execute the steps described below on a communication system. Additionally, modules 410 and 420 may comprise one or more controllers circuitry 430 which enable communication and execution between the modules.

Device 400 may establish communication with a corresponding device in the primary mode utilizing first module 410. By way of example, the primary communication may be Wi-Fi. The primary communication mode may also be defined as synchronous or connection-oriented. Upon establishing the primary communication or simultaneously therewith, a secondary communication mode (e.g., BT) may be established through second module 420. The secondary communication mode may comprise a connectionless or an asynchronous communication mode.

Controller circuitry 430 may coordinate synchronization between the corresponding devices using the less energy intensive communication mode (i.e., BT). The controller can also inactivate portions of apparatus 400 to conserve energy. The inactive portions of apparatus 400 may be activated on as-needed basis as discussed with respect to FIG. 3. The controller may be integrated with one or more of modules 410 and 420. The controller may also define an SOC in communication with the modules.

In an exemplary implementation. Controller 430 uses module 420 to identify a corresponding device while module 410 is in sleep mode. Controller 430 may use module 420 for communicating with the corresponding device. The corresponding device may provide clock and/or synchronization information to controller 430 through the secondary communication mode. Once the information is received, controller 430 may awaken module 410 and convey the clock and/or synchronization information to module 410. Module 410 may use the information to engage the corresponding device in synchronous communication.

It should be noted that while the exemplary modules are described as synchronous and asynchronous communication modules, they are not limited thereto and may comprise connection oriented and connectionless systems. In another embodiment, the primary communication mode defines any non-BT or non-BLE communication mode while the secondary communication mode defines one of BT or BLE modes.

Figure 5:
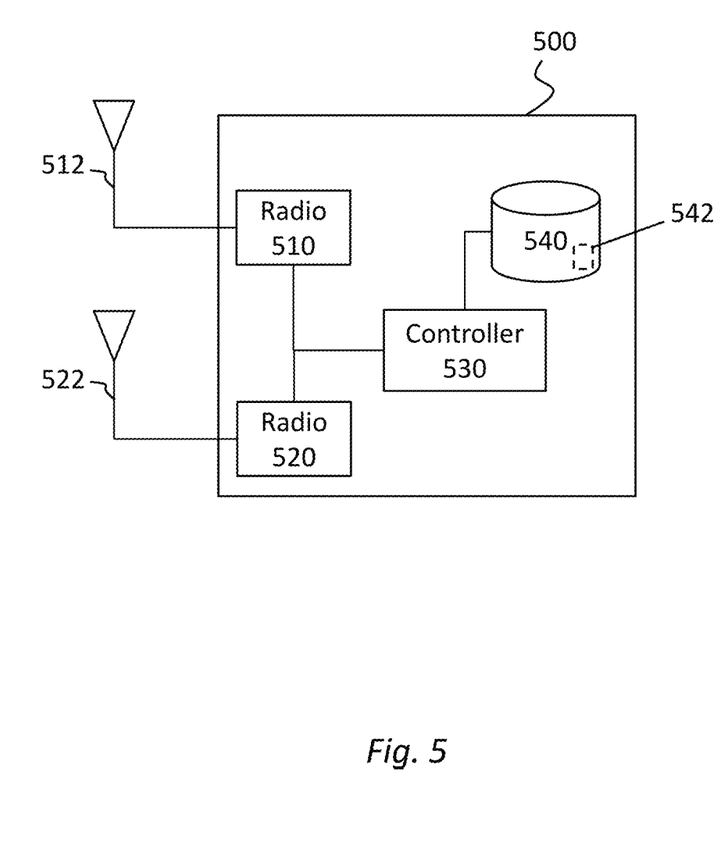
FIG. 5 illustrates an exemplary system for implementing an embodiment of the disclosure.

FIG. 5 is an exemplary system for implementing one or more of the disclosed embodiments. For example, the steps of any of the above-disclosed flow diagrams may be implemented at the system of FIG. 5. System 500 of FIG. 5 may define a mobile device such as a smartphone, a tablet or any device capable of wireless communication.

Antenna 512 communicates with radio 510. Radio 510 and antenna 512 may be configured for the primary communication mode (e.g., Wi-Fi). Antenna 522 communicates with radio 520. Radio 520 and antenna 522 may be configured for the secondary communication mode (e.g., BT/BKE). While system 500 is shown with two antennas and two radios, the disclosure is not limited thereto. Additional antennas can be added to system 500 such that different signals for different protocols can be received at different antennas. Radios 510 and 520 may include transceiver components such as front-end receiver components or a receiver/transmitter. Further, different radios may share the same antenna without departing from the disclosed principles.

Controller 530 may comprises processor circuitry, a logical processor, firmware or an SOC. Controller 530 communicates with both radios 510 and 520. Controller 530 may also direct communication between radios 510 and 530. For example, if the secondary communication mode is less energy intensive, controller 530 may direct radio 520 to communicate synchronization information from radio 510 using secondary communication signals and mode. During such communications, controller 530 may place radio 510 and antenna 512 to sleep so as to reduce energy consumption for system 500. Controller 530 may awaken radio 510 and antenna 512 during regular intervals or on as-needed bases, for example, to transfer large data quantities.

Controller 530 also communicates with memory circuit 540. In one embodiment, memory circuit 540 and controller 530 define interconnected hardware controlled by software. In another embodiment, memory circuit 540 and controller 530 defines an integrated firmware. Memory circuit 540 may comprise special instructions 542 to direct controller 530 to implement one or more of the processes described herein. For example, instructions 542 may direct controller 530 to: (1) establish communication through radio 510 (and antenna 512) with a corresponding device; (2) determine whether the corresponding device can accommodate the secondary communication means, and if so; (3) synchronize the corresponding device using radio 520 (and antenna 522); and (4) activate radio 510 (and antenna 512) on as needed basis to conserve energy.

In another embodiment of the disclosure, controller 530 utilizes the secondary communication mode to communicate additional information (i.e., information not directed to the primary mode synchronization). This information may include information that would be otherwise transmitted through the primary mode at a higher energy consumption rate.

The following examples pertain to further embodiments of the disclosure. Example 1 relates to a communication system, comprising: a Bluetooth (BT) platform having a first antenna and a BT radio, the BT platform to communicate one or more BT packets with a corresponding device; a non-BT platform having a second antenna and a non-BT radio, the non-BT platform to communicate one or more non-BT packets with the corresponding device; a controller to communicate with the BT platform and with the non-BT platform, the controller configured to: receive non-BT synchronization information from the corresponding device conveyed through the one or more BT packets, and synchronize the non-BT platform with the corresponding device using the received synchronization information.

Example 2 relates to the communication system of example 1, wherein the controller is further configured to identify the corresponding device using the BT platform.

Example 3 relates to the communication system of example 1, wherein the non-BT platform communicates through one of Wi-Fi, WiGig or cellular communication modes.

Example 4 relates to the communication system of example 1, wherein the controller is further configured to maintain the non-BT platform at sleep mode prior to synchronization.

Example 5 relates to the communication system of example 1, wherein the BT platform further comprises Bluetooth Low Energy (BLE).

Example 6 relates to the communication system of example 1, wherein the controller is further configured to receive a TSF timer value for the non-BT platform conveyed through the non-BT synchronization information.

Example 7 relates to the system of example 1, wherein the controller is further configured to receive MAC address of the non-BT platform conveyed through the non-BT synchronization information.

Example 8 relates to a device to synchronize a first communication device, comprising:

a first processor module to execute a BT communication mode through exchange of one or more BT packets with a corresponding device; a second processor module to execute a non-BT communication mode through exchange of one or more non-BT packets with the corresponding device; and a controller to communicate with the first and the second processor modules, the controller configured to receive non-BT synchronization information from a corresponding device conveyed though the one or more BT packets, and to synchronize the non-BT communication mode with the corresponding device though the received synchronization information.

Example 9 relates to the device of example 8, wherein the controller is further configured to identify the corresponding device through the first processor module.

Example 10 relates to the device of example 8, wherein the non-BT communication mode comprises one of Wi-Fi, WiGig or cellular communication modes.

Example 11 relates to the device of example 8, wherein the controller is further configured to maintain the second processor at sleep mode prior to synchronization.

Example 12 relates to the device of example 8, wherein the controller is further configured to receive a TSF timer value for the non-BT platform conveyed through the non-BT synchronization information.

Example 13 relates to the device of example 8, wherein the controller is further configured to communicate with the corresponding device and determine compatibility while the second processor module is at sleep mode.

Example 14 relates to the device of example 8, wherein the controller is further configured to receive MAC address of the non-BT platform conveyed through the non-BT synchronization information.

Example 15 relates to a method to synchronize a first communication device with a corresponding device, the method comprising: identifying the corresponding device supporting a Bluetooth (BT) communication mode and a non-BT communication mode; receiving synchronization information from the corresponding device through the BT communication mode; synchronizing the non-BT communication mode with the corresponding device through the received synchronization information.

Example 16 relates to the method of example 15, further comprising identifying the corresponding device through the BT communication mode.

Example 17 relates to the method of example 15, wherein the non-BT communication mode comprises one of Wi-Fi, WiGig or cellular communication modes.

Example 18 relates to the method of example 15, wherein the synchronization information further comprises BT master device clock, MAC address of the non-BT communication mode and duration of a beacon interval of the non-BT communication mode.

Example 19 relates to the method of example 15, further comprising maintaining the non-BT communication mode at sleep mode prior to synchronizing the first communication device with the corresponding device.

Example 20 relates to the method of example 15, wherein the BT communication mode further comprises Bluetooth Low Energy (BLE).

Example 21 relates to the method of example 15, wherein receiving synchronization information further comprising receiving a TSF timer value from the corresponding device over one or more BT packets.

Example 22 relates to a non-transient computer-readable storage device having a set of instructions to cause a processor to perform a process comprising: identify a corresponding platform configured to support a Bluetooth (BT) communication mode and a non-BT communication mode, receive synchronization information from the corresponding platform through the BT communication mode, and synchronize the non-BT communication mode with the corresponding platform through the received synchronization information.

Example 23 relates to the computer-readable storage device of example 22, wherein the set of instructions further causes the processor to identify the corresponding device through the communication mode.

Example 24 relates to the computer-readable storage device of example 22, wherein the non-BT communication mode comprises one of Wi-Fi, WiGig or cellular communication modes.

Example 25 relates to the computer-readable storage device of example 22, wherein the synchronization information includes MAC address of the non-BT communication mode and duration of a beacon signal interval of the non-BT communication mode.

While the principles of the disclosure have been illustrated in relation to the exemplary embodiments shown herein, the principles of the disclosure are not limited thereto and include any modification, variation or permutation thereof.

What is claimed is:

1. A communication system, comprising:
   a Bluetooth (BT) platform having a first antenna to communicate with a BT radio; a non-BT platform having a second antenna to communicate with a non-BT radio;
   a controller to communicate with the BT platform and with the non-BT platform, the controller configured to:
   receive non-BT synchronization information from a corresponding device using the BT packets, and
   synchronize the non-BT platform with the corresponding device using the received synchronization information;
   wherein the controller is further configured to receive a Timing Synchronization Function (TSF) timer value of the non-BT platform from the corresponding device over one or more BT packets.

2. The communication system of claim 1, wherein the controller is further configured to identify the corresponding device using the BT platform.

3. The communication system of claim 1, wherein the non-BT platform communicates using one of Wi-Fi, Wi-Gig or cellular communication modes.

4. The communication system of claim 1, wherein the controller is further configured to maintain the non-BT platform asleep prior to synchronization.

5. The communication system of claim 1, wherein the BT platform further comprises Bluetooth Low Energy (BLE).

6. The communication system of claim 1, wherein the controller is further configured to receive MAC address of the non-BT platform from the corresponding device over one or more BT packets.

7. A device to synchronize a first communication device, comprising:
- a first processor module to execute a Bluetooth (BTI communication mode;
- a second processor module to execute a non-BT communication mode; and
- a controller to communicate with the first and the second processor modules, the controller configured to receive non-BT synchronization information from a corresponding device using the BT packets, and to synchronize the non-BT communication mode with the corresponding device using the received synchronization information;
- wherein the controller is further configured to receive a Timing Synchronization Function (TSF) timer value of the non-BT platform from the corresponding device over one or more BT packets.

8. The device of claim 7, wherein the controller is further configured to identify the corresponding device using the first processor module.

9. The device of claim 7, wherein the non-BT communication mode comprises one of Wi-Fi, Wi-Gig or cellular communication modes.

10. The device of claim 7, wherein the controller is further configured to maintain the second processor asleep prior to synchronization.

11. The device of claim 7, wherein the controller is further configured to communicate with the corresponding device and determine compatibility while the second processor module is asleep.

12. The device of claim 7, wherein the controller is further configured to receive a MAC address of the non-BT platform from the corresponding device over one or more BT packets.

13. A method to synchronize a first communication device with a corresponding device, the method comprising:
- identifying the corresponding device supporting a Bluetooth (BT) communication mode and a non-BT communication mode;
- receiving synchronization information from the corresponding device using the BT communication mode;
- synchronizing the non-BT communication mode with the corresponding device using the received synchronization information;
- wherein the synchronization information includes a Timing Synchronization Function (TSF) timer value of the non-BT platform received from the corresponding device over one or more BT packets.

14. The method of claim 13, further comprising identifying the corresponding device using the BT communication mode.

15. The method of claim 13, wherein the non-BT communication mode comprises one of Wi-Fi, Wi-Gig or cellular communication modes.

16. The method of claim 13, wherein the synchronization information further comprises BT master device clock, MAC address of the non-BT communication mode and duration of a beacon interval of the non-BT communication mode.

17. The method of claim 13, further comprising maintaining the non-BT communication mode asleep prior to synchronizing the first communication device with the corresponding device.

18. The method of claim 13, wherein the BT communication mode further comprises Bluetooth Low Energy (BLE).

19. A non-transient computer-readable storage device having a set of instructions to cause a processor to perform a process comprising:
- identify a corresponding device configured to support a Bluetooth (BT) communication mode and a non-BT communication mode,
- receive synchronization information from the corresponding device using the BT communication mode, and
- synchronize the non-BT communication mode with the corresponding device using the received synchronization information;
- wherein the synchronization information includes a Timing Synchronization Function (TSF) timer value of the non-BT platform from the corresponding device over one or more BT Packets.

20. The computer-readable storage device of claim 19, wherein the set of instructions further cause the processor to identifying the corresponding device using the communication mode.

21. The computer-readable storage device of claim 19, wherein the non-BT communication mode comprises one of Wi-Fi, Wi-Gig or cellular communication modes.

22. The computer-readable storage device of claim 19, wherein the synchronization information further MAC address of the non-BT communication mode and duration of a beacon interval of the non-BT communication mode.

* * * * *